(12) United States Patent
Ajdari Rad

(10) Patent No.: US 11,679,371 B2
(45) Date of Patent: Jun. 20, 2023

(54) METHOD FOR PRODUCING FUNCTIONALLY IMPROVED CARBOLIME

(71) Applicant: SUDZUCKER AG, Mannheim (DE)

(72) Inventor: Mohsen Ajdari Rad, Worms (DE)

(73) Assignee: SUDZUCKER AG, Mannheim (DE)

( * ) Notice: Subject to any disclaimer, the term of this patent is extended or adjusted under 35 U.S.C. 154(b) by 590 days.

(21) Appl. No.: 16/643,185

(22) PCT Filed: Aug. 29, 2018

(86) PCT No.: PCT/EP2018/073197
§ 371 (c)(1),
(2) Date: Feb. 28, 2020

(87) PCT Pub. No.: WO2019/043040
PCT Pub. Date: Mar. 7, 2019

(65) Prior Publication Data
US 2020/0206716 A1    Jul. 2, 2020

(30) Foreign Application Priority Data
Aug. 31, 2017  (DE) ..................... 10 2017 215 243.5

(51) Int. Cl.
| | |
|---|---|
| *B01J 20/04* | (2006.01) |
| *A23L 2/80* | (2006.01) |
| *B01D 37/02* | (2006.01) |
| *B01J 20/28* | (2006.01) |
| *B01J 20/30* | (2006.01) |
| *C01F 11/18* | (2006.01) |
| *C05D 3/02* | (2006.01) |
| *C13B 20/02* | (2011.01) |
| *C13B 20/16* | (2011.01) |

(52) U.S. Cl.
CPC ............... *B01J 20/043* (2013.01); *A23L 2/80* (2013.01); *B01D 37/02* (2013.01); *B01J 20/28004* (2013.01); *B01J 20/28016* (2013.01); *B01J 20/3085* (2013.01); *C01F 11/185* (2013.01); *C05D 3/02* (2013.01); *C13B 20/02* (2013.01); *C13B 20/165* (2013.01); *A23V 2002/00* (2013.01); *C01P 2004/61* (2013.01); *C01P 2006/80* (2013.01)

(58) Field of Classification Search
CPC .... B01J 20/04; B01J 20/043; B01J 20/28004; B01J 20/28016; B01J 20/3085; A23L 2/80; C01F 11/185; C05D 3/02; C13B 20/02; C13B 20/165; A23V 2002/00; C01P 2004/61; C01P 2006/80
USPC ..................................................... 426/271
See application file for complete search history.

(56) References Cited

U.S. PATENT DOCUMENTS

| 5,320,681 A | 6/1994 | Moc et al. |
| 2013/0239635 A1 | 9/2013 | Ajdari Rad et al. |

FOREIGN PATENT DOCUMENTS

| DE | 10350672 A1 | 6/2005 |
| DE | 102007003463 A1 | 7/2008 |
| GB | 733418 A | 7/1955 |
| WO | 2011073614 A1 | 6/2011 |

OTHER PUBLICATIONS

Japanese Office Action issued by the Japanese Patent Office in connection with Japanese Patent Application No. 2020-511999 dated Feb. 2, 2022. (English Translation Attached).
Iranian Office Action issued by the Iranian Patent Office in connection with International Patent Application No. 139650140003009715.
Anuar Othman, et al. "Preparation of Precipitated Calciumcarbonate Using Additive and Without Additive", Jurnal Teknologs (Science and Engineering), 2015.
List of References cited in DE 102017215243.5.
International Search Report issued by the European Patent Office acting as the International Searching Authority in relation to International Application No. PCT/EP2018/073197, dated Oct. 12, 2018, 12 pages (English Translation attached).

*Primary Examiner* — Edward M Johnson
(74) *Attorney, Agent, or Firm* — Carter, DeLuca & Farrell LLP; George Likourezos; Carmella Stephens

(57) ABSTRACT

A method is provided for producing functionally improved carbolime from carbolime and the use of the functionally improved carbolime as a filtering aid, as filler, as lime fertilizer or as adsorbent for the adsorption of dyes.

Figure 1:
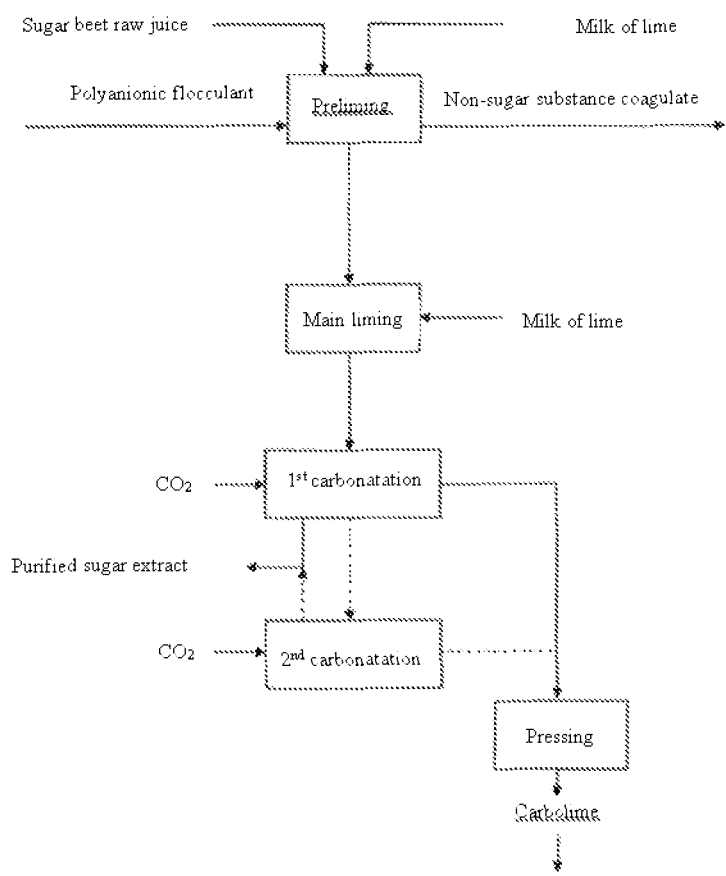

10 Claims, 2 Drawing Sheets

METHOD FOR PRODUCING FUNCTIONALLY IMPROVED CARBOLIME

CROSS-REFERENCE TO RELATED APPLICATIONS

This application is a national phase entry under 35 U.S.C. 371 of PCT International Application No. PCT/EP2018/073197 filed Aug. 29, 2018, which claims priority to German Patent Application No. 10 2017 215 243.5, filed Aug. 31, 2017, the disclosure of each of these applications is expressly incorporated herein by reference in their entirety.

The present invention relates to a method for producing functionally improved carbolime from carbolime and also functionally improved carbolime which can be produced according to the inventive method, and the use of functionally improved carbolime as filtering aid, as filler, as lime fertilizer or as adsorbent for the adsorption of dyes.

In the extraction of sugar from beets, the harvested beets are first freed from adhering soil and leaves residue, and after washing, they are grated into pencil-thin chips by cutting machines. Subsequently, the sugar is extracted from the beet chips by countercurrent extraction using hot, slightly acidified water having a pH value of approximately 5.5 to 5.8. The acidification of the extraction liquid favors the filtration of the sugar beet raw juice as well as the pressability of the extracted chips. The sugar beet raw juice obtained during extraction is subsequently subjected to an extract purification process. In conventional methods, the purification of the sugar beet extract is carried out with the aid of the so-called lime-carbonic acid extract purification, comprising a preliming step, a main liming step as well as a first and second carbonatation step, and the removal of the precipitate after the first and second carbonation steps. It is the task of the extract purification to substantially remove the organic non-sugar substances present in the sugar beet raw juice, in particular high molecular weight substances. Care must be taken to ensure that the non-sugar substances to be removed are not degraded during purification to the extent possible, so that no additional low molecular weight substances resulting from the degradation enter the extract or sugar beet raw juice.

During pre-liming, the sugar beet raw juice is incrementally alkalized under gentle conditions by adding milk of lime. The pH value of the sugar beet raw juice in the pre-liming reactor is gradually raised to approximately 11.5. The preliming step is carried out with the addition of defined amounts of calcium hydroxide (milk of lime), the alkalinity of the juice at the end of the pre-liming step being approximately 0.1 to 0.3 g CaO/100 ml sugar beet raw juice. As a result of the alkalization of the sugar beet raw juice, the organic and inorganic acids present in the extract are neutralized and precipitation reactions of the anions contained in the sugar beet raw juice, which form insoluble or sparingly soluble salts with divalent calcium ions, occur. In this way, for example, phosphate, oxalate, citrate and sulfate are precipitated in the form of corresponding calcium salts and can subsequently be removed from the sugar beet raw juice. Moreover, under these conditions, coagulation of dissolved organic non-sugar substances and precipitation of the formed colloids occur. The precipitation of individual ingredients, for example of anions, such as oxalate, phosphate, citrate, sulfate or colloids such as pectin or proteins, takes place within defined pH ranges. Within these pH ranges, compaction of the precipitate takes place at the same time.

The addition of milk of lime during the preliming step also leads to coagulation of proteins contained in sugar beet raw juice.

In the subsequent main liming step, in particular the chemical degradation of invert sugar and acid amides occurs, which, without a main liming step, would not take place until the thickening of the juice, with the formation of acids. In the main liming step, the temperature is raised to approximately 85° C., and the pH value of the sugar beet juice is significantly increased by the addition of milk of lime, namely to an alkalinity of approximately 0.8 to 1.1 g CaO/100 ml sugar beet raw juice. The processes sought in the main liming step only take place in the traditional method under such drastic conditions. The lime added in excess in the main liming step also plays an important role in the first and second carbonatation steps. The reaction to calcium carbonate provides a strong adsorbent for a number of soluble organic non-sugar substances, and also a suitable filtering aid. The lime not consumed during the main liming process is converted into calcium carbonate in the two carbonatation steps by the introduction of carbon dioxide as the carbonatation gas. Carbonatation is carried out in two stages. In the first carbonatation stage, gas is introduced until a pH value of approximately 11.2 to 10.6 is reached, which corresponds to an alkalinity of 0.1 to 0.06 g CaO/100 ml of the filtrate of the first carbonatation. In the first carbonatation stage, the precipitated and flocculated organic non-sugar substances and some of the dyes contained in sugar beet juice are adsorptively bound to the calcium carbonate formed. The so-called first carbonation juice obtained in the first carbonatation stage is filtered through a thickening filter (candle filter) or conducted into decanters and in this way thickened to give a carbonation juice concentrate. The precipitated and flocculated organic non-sugar substances bound to calcium carbonate are removed from the juice. Usually, the first carbonatation stage is followed by a post-liming step, wherein the juice is mixed with some milk of lime and then further carbonated in the second carbonation stage. Carbonatation gas is supplied also in the second carbonatation stage, the alkalinity to be set ranging from 0.025 to 0.10 g of CaO/100 ml of the filtrate of the second carbonatation. This alkalinity corresponds to a pH value of approximately 9.0 to 9.3. In the second carbonatation stage, the so-called second carbonation juice is produced, which is also filtered through a thickening filter and thereby thickened. The calcium carbonate sludges (carbonation juice concentrates) concentrated with the thickening filters in the first and second carbonatation steps are then usually combined and pressed by way of membrane filter presses. In this way, the so-called carbonatation lime (carbolime) is formed. This is a storable product with a dry substance content of more than 70%, which is used in particular in agriculture as a fertilizer.

A major disadvantage of the conventional lime-carbonic acid extract purification is that the method requires the use of very large amounts of lime, wherein the amount of lime consumed can account for approximately 2.5% of the total weight of the processed sugar beets. The production of the lime used in the lime-carbonic acid extract purification process and the disposal of the waste formed during production of quicklime are associated with enormous environmental and economic disadvantages. The carbolime resulting from the lime-carbonic acid extract purification process, which mainly consists of lime and separated juice impurities, can hitherto only be used as fertilizer (lime fertilizer).

The present invention is therefore based on the technical problem of providing a method for producing functionally improved carbolime, in particular one which is suitable for use in the lime-carbonic acid extract purification of sugar beet raw juice.

The present invention solves the underlying technical problem in particular by providing a method for producing functionally improved carbolime from carbolime, comprising the following steps to be carried out sequentially:

a) providing a carbolime having an average particle size of no more than 20 μm, containing at least 85% by weight $CaCO_3$ and no more than 1% by weight organic non-sugar substances (each DS (dry substance), based on the DS of the carbolime);

b) carbonatating the carbolime;

c) removing a dye-containing liquid phase from the carbonatated carbolime to obtain a precursor of functionally improved carbolime, d) obtaining the functionally improved carbolime.

The method according to the invention therefore advantageously provides to carbonatate carbolime, in particular carbolime that was obtained from the first and/or second carbonatation of a lime-carbonic acid extract purification process, and to remove precipitated and/or adsorbed non-sugar substances, in particular dyes, which are adsorptively bound to the carbolime, from the carbonated carbolime so as to obtain a precursor of functionally improved carbolime, from which finally functionally improved carbolime is obtained, which can, in particular, be used for a variety of applications due to the high purity and high $CaCO_3$ content thereof.

If, following method step c), calcium hydroxide ($Ca(OH)_2$) is added to the precursor of functionally improved carbolime obtained in method step c), it is possible to use the functionally improved carbolime obtained in method step d) as a filtering aid and adsorbent for the adsorption of dyes again in the lime-carbonic acid extract purification of sugar beet raw juice. The method according to the invention thus makes it possible, on the one hand, to produce functionally improved carbolime, proceeding from carbolime that results during lime-carbonic acid extract purification, which makes it possible to reduce the amount of lime necessary for the purification of sugar beet raw juice, and thus to improve the lime-carbonic acid extract purification process ecologically and economically. In particular, the carbolime that has been functionally improved by the method according to the invention is advantageously suitable not only as a fertilizer, but can also be used, for example, as a filtering aid, as a filler or as an adsorbent for the adsorption of dyes.

In a particularly preferred embodiment of the present invention, method steps a) to d) are carried out in the provided sequence. Particular preference is given to a method according to the invention composed of method steps a) to d), that is, no further method steps are carried out between the cited method steps. In particular, no further method steps are carried out in the method for producing a functionally improved carbolime from a carbolime before or after method steps a) to d).

In a preferred embodiment of the present invention, the carbolime provided in method step a) has a dry substance content of 55 to 80% by weight, preferably 60 to 80% by weight, preferably 65 to 80% by weight, preferably 70 to 80% by weight, preferably from 75 to 80% by weight, (based on the total weight of the carbolime).

In a preferred embodiment of the present invention, the carbolime provided in method step a) has an average particle size of no more than 18 μm, preferably no more than 16 μm, preferably no more than 14 μm, preferably no more than 12 μm.

In a particularly preferred embodiment of the present invention, the carbolime provided in method step a) has an average particle size of no more than 10 μm, preferably no more than 9.5 μm, preferably no more than 9 μm, preferably no more than 8.5 μm, preferably no more than 8 μm, preferably no more than 7.5 μm, preferably no more than 7 μm, preferably no more than 6.5 μm, preferably no more than 6 μm, preferably no more than 5.5 μm, preferably no more than 5 μm.

In a preferred embodiment of the present invention, the carbolime provided in method step a) comprises no more than 0.9% by weight, preferably no more than 0.8% by weight, preferably no more than 0.7% by weight, preferably no more than 0.6% by weight, preferably no more than 0.5% by weight organic non-sugar substances (each DS (dry substance), based on DS of the carbolime).

In a preferred embodiment of the present invention, the carbolime used in method step a) is carbolime obtained from the first and/or second carbonatation steps of a conventional lime-carbonic acid extract purification process by pressing the respective carbonatation sludges.

In a preferred embodiment of the present invention, the carbolime used in method step a) is a colloid-reduced carbolime, preferably a colloid-free carbolime.

In a particularly preferred embodiment of the present invention, the carbolime provided in method step a) having an average particle size of no more than 20 μm and containing at least 85% by weight $CaCO_3$ and no more than 1% by weight organic non-sugars (each DS (dry substance), based on the DS of the carbolime) obtainable, preferably obtained, from a method for producing carbolime, comprising the steps of:

i) preliming the raw sugar beet juice by adding milk of lime until an alkalinity of approximately 0.1 to 0.3 g CaO/100 ml sugar beet raw juice is achieved, for the precipitation and/or coagulation of non-sugar substances in the form of a coagulate;

ii) adding at least one acrylamide/sodium acrylate copolymer having a molecular mass of approximately 5 million to approximately 22 million as a polyanionic flocculant, up to a concentration of 1 to 8 ppm;

iii) removing the coagulate from the preliming juice, using at least one first removal device, obtaining a clear preliming juice;

(iv) main liming the clear preliming juice obtained after removal of the coagulate by adding milk of lime until an alkalinity of approximately 0.6 g CaO/100 ml in the preliming juice is achieved;

v) carrying out a first carbonatation step by introducing carbon dioxide into the main liming juice, and if necessary, carrying out a second carbonation step to obtain a first and optionally second carbonation juice;

vi) pressing off the first and, if necessary, the second carbonation juice to obtain a carbolime having an average particle size of no more than 20 μm, containing at least 85% by weight $CaCO_3$ and no more than 1% by weight organic non-sugars (each DS (dry substance) based on DS of the carbolime).

The above-described method for producing carbolime, in comparison with established methods from the prior art, has the advantage, in particular, that, by removal of the non-sugar substances precipitated and flocculated in the preliming step, carbolime is obtained in a later step which, in comparison to carbolime obtained using conventional lime-carbonic acid extract purification processes, is characterized by a significantly higher content of calcium carbonate and a significantly reduced content of non-sugar substances.

Moreover, the carbolime obtained by using the above-described method for producing carbolime is low in phosphate. Due to its composition, the carbolime obtained according to the above-described method for producing carbolime can be used, in particular, in the method according to the invention for producing functionally improved carbolime.

In a preferred embodiment of the present invention, method steps i) to vi) are carried out before method steps a) to d). Preferably, no further method steps take place between method steps i) to vi) and a) to d).

In a preferred embodiment of the present invention, a dilution of the carbolime is carried out between method steps a) and b), between method steps b) and c) or between method steps a) and b) as well as b) and c). In a particularly preferred embodiment, the carbolime is diluted by the addition of an aqueous medium, in particular condensate or water. The dilution of the carbolime is preferably carried out by the addition of condensate. The dilution of the carbolime is preferably carried out by the addition of water.

In a particularly preferred embodiment, the carbolime provided in method step a) is diluted before conducting method step b) by the addition of an aqueous medium, in particular condensate or water, in particular a suspension is prepared, in particular having a dry substance content of 25 to 40% by weight, preferably 30 to 40% by weight, preferably 35 to 40% by weight (based on the total weight of the carbonatating carbolime).

In the context of the present invention, a "condensate" shall be understood to mean an aqueous medium, in particular water, which results from plants, in particular sugar beets, during sugar production as a result of evaporation and condensation, and can be used as process water.

In a preferred embodiment of the present invention, the carbolime provided in method step a) is heated to a temperature of 50 to 90° C., preferably 60 to 85° C., preferably 70 to 85° C., preferably 80° C., before method step b). The heating of the carbolime provided in method step a) advantageously leads to a further improvement in the purity of the functionally improved carbolime obtained in method step d).

In a preferred embodiment of the present invention, the carbolime used in method step b) for the carbonatation has a dry substance content of 25 to 40% by weight, preferably 30 to 40% by weight, preferably 35 to 40% by weight (based on the total weight of the carbolime to be carbonatated).

In a preferred embodiment of the present invention, the carbonatation of the carbolime in method step b) takes place by gassing with carbon dioxide.

In a preferred embodiment of the present invention, the carbonatation of the carbolime in method step b) takes place by gassing with carbon dioxide until a pH value of 8.0 to 9.0, preferably 8.2 to 8.8, preferably 8.3 to 8.7, preferably 8.4 to 8.6, preferably 8.5 is reached.

In a preferred embodiment of the present invention, the carbonatated carbolime supplied to the removal process in method step c) has a dry substance content of 15 to 30% by weight, preferably 20 to 30% by weight, preferably from 25 to 30% by weight (based on the total weight of the carbonatated carbolime).

The carbonatation of the carbolime in method step b) results in the formation of a solids content, which is formed by a precursor of the carbolime to be obtained, that is, a precursor of the functionally improved carbolime to be obtained, and a dye-containing liquid phase.

In a preferred embodiment of the present invention, the removal of the dye-containing liquid phase from the carbonatated carbolime is carried out in method step c) using a removal device.

In a particularly preferred embodiment of the present invention, the removal of the dye-containing liquid phase from the carbonatated carbolime in method step c) is carried out by decantation, filtration or centrifugation, preferably by decantation, preferably by filtration, preferably by centrifugation.

In one embodiment of the present invention, it is possible, in method step d), to obtain the functionally improved carbolime directly by pressing, in particular by way of at least one membrane filter press, from the precursor of the functionally improved carbolime obtained in method step c).

In another embodiment of the present invention, the precursor of the functionally improved carbolime obtained in method step c) is activated, subsequent to method step c), by the addition of calcium hydroxide ($Ca(OH)_2$), and in the step d), the functionally improved carbolime can then be obtained by pressing, in particular by way of a membrane filter press.

In a preferred embodiment of the present invention, an addition of calcium hydroxide ($Ca(OH)_2$) to the precursor of functionally improved carbolime obtained in method step c) is carried out subsequent to method step c).

In a preferred embodiment of the present invention, an addition of calcium hydroxide ($Ca(OH)_2$) to the precursor of functionally improved carbolime obtained in method step c) is carried out subsequent to method step c) for the purpose of setting a pH value of 10 to 12, preferably 10.5 to 11.5, preferably to 11.

The addition of calcium hydroxide ($Ca(OH)_2$) results in activation of the surface of $CaCO_3$ crystals, whereby improved adsorption of non-sugar substances, in particular dyes, on the surface of the crystals is achieved.

In a preferred embodiment of the present invention, the functionally improved carbolime is obtained in method step d) from the precursor of functionally improved carbolime obtained in method step c) by means of at least one membrane filter press.

In a preferred embodiment of the present invention, the functionally improved carbolime is obtained in method step d) by means of at least one membrane filter press after the addition of calcium hydroxide ($Ca(OH)_2$) to the precursor of functionally improved carbolime obtained in method step c).

In a preferred embodiment of the present invention, the functionally improved carbolime obtained in method step d) has a calcium carbonate content ($CaCO_3$ content) of at least 90% by weight, preferably at least 91% by weight, preferably at least 92% by weight (DS, based on DS of the functionally improved carbolime).

In a preferred embodiment of the present invention, the functionally improved carbolime obtained in method step d) has a dry substance content of 85 to 95% by weight, preferably 88 to 92% by weight, preferably 90% by weight (based on the total weight of the functionally improved carbolime).

The present invention also relates to functionally improved carbolime producible, preferably produced, by the method according to the invention.

The present invention also relates to the use of functionally improved carbolime producible, preferably produced, by the method according to the invention as a filtering aid, as a filler, as a lime fertilizer or as an adsorbent for the adsorption of dyes.

The present invention also relates to the use of functionally improved carbolime producible, preferably produced, according to the method according to the invention, in particular after the addition of $Ca(OH)_2$ to the precursor of functionally improved carbolime obtained in method step c), for juice purification, in particular for lime-carbonic acid extract purification.

In the context of the present invention, the term "functionally improved carbolime" shall be understood to mean carbolime that differs, in particular in terms of the purity and high $CaCO_3$ content thereof, from untreated carbolime, which is obtained in the first and/or second carbonatation steps of the lime-carbonic acid extract purification by pressing of the respective carbonate sludges, in that, in contrast to untreated carbolime, it can be used for various applications, for example as fertilizer, filtering aid, filler or adsorbent for the adsorption of dyes. According to the invention, the functionally improved carbolime can be both carbolime obtained in step d) directly from the precursor of functionally improved carbolime obtained in step c), and also carbolime obtained in step d) after the addition of $Ca(OH)_2$ to the precursor of functionally improved carbolime obtained in step c).

According to the invention, the term "functionally improved carbolime" thus denotes carbolime that is the result of the method according to the invention, in particular comprising method steps a), b), c) and d).

The carbolime produced according to the invention, that is, the functionally improved carbolime, is thus the product of the method according to the invention for producing carbolime from a carbolime, comprising method steps a), b), c) and d), and, if necessary, of further method steps that are carried out, and can thus be obtained by carrying out these method steps. The carbolime provided according to the invention is functionally improved, in particular due to the purity and high $CaCO_3$ content thereof, and accordingly can be utilized for larger multitude of applications, that is, functions.

In the context of the present invention, "carbonatation" (also "carbonatiztion") shall be understood to mean the increase in the carbonate content of a calcium-containing solution or suspension by the introduction of carbon dioxide. In particular, the term according to the invention denotes the chemical reaction in which insoluble calcium carbonate is formed from calcium hydroxide and carbon dioxide.

In the context of the present invention, the term "non-sugar substances" shall be understood to mean high molecular weight substances such as proteins, polysaccharides and cell wall components, as well as low molecular weight compounds such as inorganic and organic acids, amino acids, dyes and mineral substances. The cell wall components are, in particular, pectins, lignin, cellulose and hemicellulose. These substances, as well as proteins, which include, in particular, nucleoproteins, are present in the form of hydrophilic macromolecules in colloidally dispersed form. Organic acids are, for example, lactates, citrates and oxalates. Inorganic acids are in particular sulfates and phosphates. The term "organic non-sugar substances" in the context of the present invention shall be understood to mean carbon-based high molecular and low molecular weight chemical compounds, which are not sugar substances.

"Preliming" shall be understood to mean the addition of milk of lime to sugar beet raw juice or sugar beet extract up to approximately 0.1 to 0.3 g CaO/100 ml sugar beet raw juice. In the preliming step, the sugar beet raw juice is alkalized under gentle conditions, the pH value of the sugar beet raw juice being raised from approximately 6 to approximately 11.5. The preliming step is used to flocculate non-sugar substances, such as pectins and proteins, and precipitate sparingly soluble calcium salts.

In the context of the present invention, "main liming" shall be understood to mean the further addition of milk of lime to the preliming juice to increase the alkalinity of the preliming juice at an elevated temperature, wherein a main liming juice is obtained. The task of the main liming step is, in particular, the chemical degradation of invert sugar and acid amides.

The term "sugar beet raw juice" shall be understood to mean the juice that is extracted from chips by countercurrent extraction at approximately 65 to 75° C. in the so-called diffusion process. This sugar beet raw juice high in sugar contains not only sugar, but also various organic and inorganic components of the beet, which are referred to as non-sugar substances.

"Milk of lime" shall be understood to mean, in particular, calcium hydroxide ($Ca(OH)_2$), which forms during the highly exothermic reaction of quicklime (calcium oxide) with water and is used as a liming agent during preliming and main liming The addition of milk of lime to the sugar beet raw juice during preliming causes the precipitation or coagulation of non-sugars in the form of a coagulate.

The term "coagulate" shall be understood to mean the aggregations, formed as a result of the flocculation process, of the non-sugar substances present in the sugar beet raw juice, which are also referred to as protein-containing fractions from the preliming step. The coagulate comprises, in particular, the insoluble or sparingly soluble salts formed by the reaction of the anions of organic or inorganic acids with calcium, and the precipitated high molecular weight sugar beet raw juice components, in particular of a hydrophilic nature, such as proteins, polysaccharides and cell wall components, which are normally colloidally dispersed in the sugar beet raw juice. The flocculation process is subdivided into a flocculation step, in which the aggregation takes place by the adsorption of bridging polymers, and a coagulation step, in which the aggregation takes place by degradation or reduction of repulsion forces. The flocculation rate is dependent on the temperature, the pH value and the manner of addition of milk of lime. The supply of mechanical energy, for example during stirring and shaking, thermal energy, for example as a result of a temperature increase, electrical energy, and the like, can accelerate flocculation or coagulation. The precipitation of individual juice constituents, for example anions such as oxalate, phosphate, citrate and sulfate, as well as colloids such as pectin and protein, takes place in certain pH ranges, wherein densification of the precipitate takes place within these pH ranges. The pH value at which a maximum amount of colloids is flocculated and the precipitation of insoluble lime salts is almost complete is referred to as the optimum flocculation point of the preliming step. If the precipitation occurs at the optimum flocculation point, uniform stable flocculation of colloidally disperse, high molecular weight juice constituents occurs.

A "flocculant" shall be understood to mean a substance that influences the zeta potential of particles in colloidal suspensions in such a way that they aggregate into flakes and can be removed from the system, for example, after sedimentation. Flocculants must therefore overcome the electrostatic repulsion of the particles, which are mostly negatively charged in water.

According to the invention, a "separation or removal device" is, in particular, a device for solid/liquid separation. The solid/liquid separation is based on mechanical processes, which are based on the utilization of gravity, centrifugal force, pressure or vacuum. The solid/liquid separation processes on which the mode of action of a described separation or removal device is based, include decantation, filtration, sedimentation, clarification and centrifugation.

In the context of the present invention, a "membrane filter press" shall be understood to mean a filter device, which is designed either as a frame filter press or as a chamber filter press. A membrane filter press designed as a frame filter press is composed of a plurality of orthogonal, vertically standing, channeled plates connected in parallel, which are covered with membranes or are designed as membrane filters, and interposed frames for receiving the filter cake. A membrane filter press designed as a chamber filter press is composed of a plurality of membrane filter plates, the strong edge of which protrudes from the actual filter surface, so that a chamber for receiving the filter cake forms between two such plates.

In the context of the present invention, "decantation" shall be understood to mean a method for the mechanical removal of sedimented substances from a liquid according to the sedimentation principle with the aid of the gravity.

In the context of the present invention, the term "comprising" shall be understood to mean that, in addition to the elements explicitly referred to, other elements which are not explicitly mentioned may also be present. In the context of the present invention, the term shall also be understood to mean that only the explicitly mentioned elements are covered, and no further elements are present. In this particular embodiment, the meaning of the term "comprising" is equivalent to the term "consisting of". In addition, the term "comprising" also encompasses totalities which, in addition to the explicitly mentioned elements, also contain other elements not mentioned, but which are of a functionally and qualitatively subordinate nature. In this embodiment the term "comprising" is equivalent to the term "consisting essentially of".

Further preferred embodiments are the subject-matter of the dependent claims.

The present invention is illustrated based on the following examples and figures.

Figure 2:
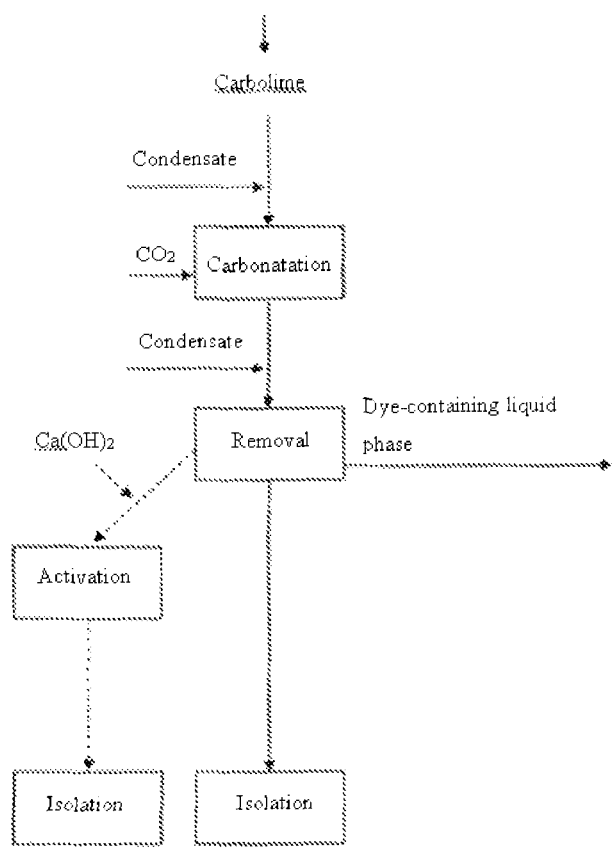

FIG. 1 schematically shows a method for producing carbolime suitable for use in the method according to the invention; and FIG. 2 schematically shows the method steps carried out for the production of functionally improved carbolime from carbolime.

EXAMPLE 1

1. Production of Functionally Improved Carbolime 1.1 Production of Carbolime Suitable for Use in the Method According to the Invention a) Preliming 30 kg of sugar beet raw juice are added to a heatable container having a volume of 50 l, which comprises a stirrer, a $CO_2$ inlet tube and a pH electrode, and the mixture is heated to 55° C. Over a period of 20 minutes, milk of lime is gradually added to the raw juice, up to the pH value of the optimum flocculation point of the preliming step (approximately 0.1 to 0.3 g CaO/100 ml of juice). To increase the settling rate, a polyanionic flocculation aid (AN 945) is subsequently added. The formed clear supernatant (clarified juice) is drawn off into a storage container. The preliming coagulate formed is drained and fed to a membrane filter press or decanter centrifuge.

b) Main Liming 25 g of clarified juice are added to the cleaned, heatable container and mixed with milk of lime, up to an alkalinity of 0.6 g of CaO/100 ml of juice. The juice temperature is then raised to 85° C. This temperature is maintained for 20 minutes.

c) First Carbonatation

By introducing $CO_2$, the pH value is lowered to 11.2 over a period of 15 min d) First Filtration The carbonatated juice is transferred to a 30-liter pressure filter and filtered. The filtration coefficient of the first carbonation juice obtained is less than 0.5 s/cm².

e) Second Carbonatation

The filtered juice is transferred into the cleaned, heatable container and heated to 95° C. By introducing $CO_2$, the pH is lowered to 9.2.

f) Second Filtration

The carbonatated juice is transferred to a 30-liter pressure filter and filtered. A second carbonation juice and thin juice are obtained.

g) Separation of Carbolime

The carbonation juices (steps d) and f)) obtained from the first and second carbonation steps (steps c) and e)) by means of filtration are combined and pressed by means of membrane filter presses to obtain carbolime. The carbolime obtained has a $CaCO_3$ content of 86%, a particle size of the $CaCO_3$ crystals of <20 μm and an amount of organic non-sugar substances of approximately 1% (DS, based on DS of the carbolime).

1.2 Production of Functionally Improved Carbolime from Carbolime

First, the colliod-free carbolime according to section 1.1, having a $CaCO_3$ content of 86%, a particle size of the $CaCO_3$ crystals of <20 μm and a quantity of organic non-sugars of approx. 1%, is suspended with condensate (the use of water is also possible) to obtain a carbolime suspension having a solids content of approximately 30 to 35% dry substance. The resulting suspension was heated to approximately 80° C. and then gassed (carbonatated) with carbon dioxide to reduce the pH value of the suspension. The pH value endpoint was 8.5 after gassing with carbon dioxide. The resulting suspension was then diluted with condensate (the use of water is also possible) to a dry substance content of 25%, and the solids fraction is removed from the dye-containing liquid phase by decantation (other suitable separation methods, such as filtration or centrifugation are also possible). The obtained precursor of functionally improved carbolime had a $CaCO_3$ content of 93%.

The obtained precursor of functionally improved carbolime can subsequently be pressed either directly by means of membrane filter presses to obtain functionally improved carbolime or be used to produce activated functionally improved carbolime according to Example 2.

EXAMPLE 2

Production of Activated Functionally Improved Carbolime

In order to activate the functionally improved carbolime ($CaCO_3$ content of 93%) from Example 1, fresh milk of lime ($Ca(OH)_2$) was added to the precursor obtained from functionally improved carbolime having a dry substance content of approx. 35%, to set a pH value of approx. 11 and then pressed by means of membrane filter presses.

The invention claimed is:

1. A method for producing functionally improved carbolime from carbolime, comprising the following method steps:
   a) providing a carbolime having an average particle size of no more than 20 µm, containing at least 85% by weight $CaCO_3$ and no more than 1% by weight organic non-sugar substances (each DS (dry substance), based on the DS of the carbolime);
   b) carbonatating the carbolime;
   c) removing a dye-containing liquid phase from the carbonatated carbolime to obtain a precursor of functionally improved carbolime; and
   d) obtaining the functionally improved carbolime.

2. The method according to claim 1, wherein a dilution of the carbolime is carried out between method steps a) and b), between method step b) and c) or between method steps a) and b) as well as b) and c).

3. The method according to claim 1, wherein the functionally improved carbolime obtained in method step d) is obtained from the precursor of functionally improved carbolime obtained in method step c) by means of at least one membrane filter press.

4. The method according to claim 1, wherein the functionally improved carbolime obtained in method step d) has a $CaCO_3$ content of at least 90% by weight (DS, based on the functionally improved carbolime).

5. The method according to claim 1, wherein, subsequent to method step c), $Ca(OH)_2$ is added to the precursor of functionally improved carbolime obtained in method step c).

6. The method according to claim 1, wherein the carbolime provided in method step a) has a dry substance content of 55 to 80% by weight (based on the total weight of the carbolime).

7. The method according to claim 1, wherein the carbolime used for the carbonatation in method step b) has a dry substance content of 25 to 40% by weight (based on the total weight of the carbolime to be carbonatated).

8. The method according to claim 1, wherein the carbonatated carbolime, which is fed to the removal in method step c), has a dry substance content of 15 to 30% by weight (based on the total weight of the carbonatated carbolime).

9. The method according to claim 1, wherein the functionally improved carbolime obtained in method step d) has a dry substance content of 85 to 95% by weight (based on the total weight of the functionally improved carbolime).

10. The method according to claim 1, wherein the carbolime used in method step a) is a colloid-reduced carbolime.

* * * * *